(12) United States Patent
Cox et al.

(10) Patent No.: US 7,772,538 B2
(45) Date of Patent: *Aug. 10, 2010

(54) FLOAT ACTIVATED OPTICAL SWITCH

(76) Inventors: Raleigh L. Cox, 15582 Summerwood Ave., Baton Rouge, LA (US) 70817;
Christopher E. Cox, 17715 S. Harrell's Ferry Rd., Baton Rouge, LA (US) 70816

( * ) Notice: Subject to any disclaimer, the term of this patent is extended or adjusted under 35 U.S.C. 154(b) by 0 days.

This patent is subject to a terminal disclaimer.

(21) Appl. No.: 11/762,823

(22) Filed: Jun. 14, 2007

(65) Prior Publication Data
US 2007/0236914 A1    Oct. 11, 2007

Related U.S. Application Data

(63) Continuation of application No. 11/241,909, filed on Oct. 3, 2005, now Pat. No. 7,234,830.

(51) Int. Cl.
*G06M 7/00* (2006.01)
*G01N 21/85* (2006.01)

(52) U.S. Cl. .................................. 250/221; 250/577

(58) Field of Classification Search ................ 250/573, 250/577, 214 SW, 221, 227.11; 73/290 R, 73/293, 305; 340/618, 619, 623; 200/61.02, 200/61.52
See application file for complete search history.

(56) References Cited

U.S. PATENT DOCUMENTS

| | | | | |
|---|---|---|---|---|
| 3,082,400 | A | * 3/1963 | Coop | ........................ 340/850 |
| 3,863,067 | A |   1/1975 | Gooley | |
| 4,051,723 | A |  10/1977 | Head et al. | |
| 4,064,754 | A |  12/1977 | Frey | |
| 4,091,671 | A |   5/1978 | McLees | |
| 4,156,149 | A | * 5/1979 | Vaccari | ....................... 250/577 |
| 4,519,257 | A |   5/1985 | Simpkins | |
| 4,629,841 | A | *12/1986 | Riback et al. | ................ 200/553 |
| 4,836,632 | A | * 6/1989 | Bardoorian | ............ 250/227.11 |
| 4,856,874 | A |   8/1989 | Tusting | |
| 4,938,590 | A |   7/1990 | Ishida | |

(Continued)

FOREIGN PATENT DOCUMENTS

JP        357042817 A      3/1982

(Continued)

OTHER PUBLICATIONS

PCT Search Report in PCT/US2007/70122, Mar. 27, 2008.

(Continued)

*Primary Examiner*—Que T Le
*Assistant Examiner*—Jennifer Bennett
(74) *Attorney, Agent, or Firm*—Jones, Walker, Waechter, Poitevent, Carrere & Denegre, LLP

(57) ABSTRACT

An optical switch having a housing, a light source and a light detector. The light source and light detector are located remote from the housing, The light source is connected to the housing with a first light guide, and the light detector is connected to the housing with a second light guide. The first and second light guide cables have distal ends positioned through the housing and are optically aligned but separated by a gap. The switch includes a device to interrupt a light beam that is usually adapted to removably occupy the gap.

17 Claims, 3 Drawing Sheets

U.S. PATENT DOCUMENTS

| | | | |
|---|---|---|---|
| 5,017,748 A * | 5/1991 | Sapiro .................... 200/84 C |
| 5,072,617 A | 12/1991 | Weiss |
| 5,105,663 A | 4/1992 | Kuhlen |
| 5,124,686 A | 6/1992 | White et al. |
| 5,130,535 A | 7/1992 | Kummer et al. |
| 5,373,153 A | 12/1994 | Cumberledge et al. |
| 5,585,786 A | 12/1996 | Clark et al. |
| 5,684,296 A * | 11/1997 | Hamblin et al. ........ 250/227.11 |
| 5,743,135 A * | 4/1998 | Sayka et al. .................. 73/293 |
| 5,874,899 A | 2/1999 | Barmore et al. |
| 5,950,487 A * | 9/1999 | Maresca et al. .............. 73/293 |
| 6,125,218 A | 9/2000 | Humphrey |
| 6,555,837 B2 | 4/2003 | Benton |
| 6,650,820 B2 | 11/2003 | Ross et al. |
| 6,727,822 B2 | 4/2004 | Chamberlin et al. |
| 6,832,035 B1 | 12/2004 | Daoud et al. |
| 7,234,830 B1 * | 6/2007 | Cox et al. ................... 362/101 |
| 7,272,289 B2 | 9/2007 | Bickham et al. |
| 7,444,042 B1 | 10/2008 | Niblock et al. |
| 2006/0139177 A1 | 6/2006 | Gomery |

FOREIGN PATENT DOCUMENTS

JP          07218847 A  *  8/1995

OTHER PUBLICATIONS

PCT/US2007/70122, May 31, 2007, Cox.
Corning, Corning ClearCurve Optical Fiber, 4-Page Brochure printed from www.corning.com/clearcurve, website, copyright 2008, Corning Incorporated.

* cited by examiner

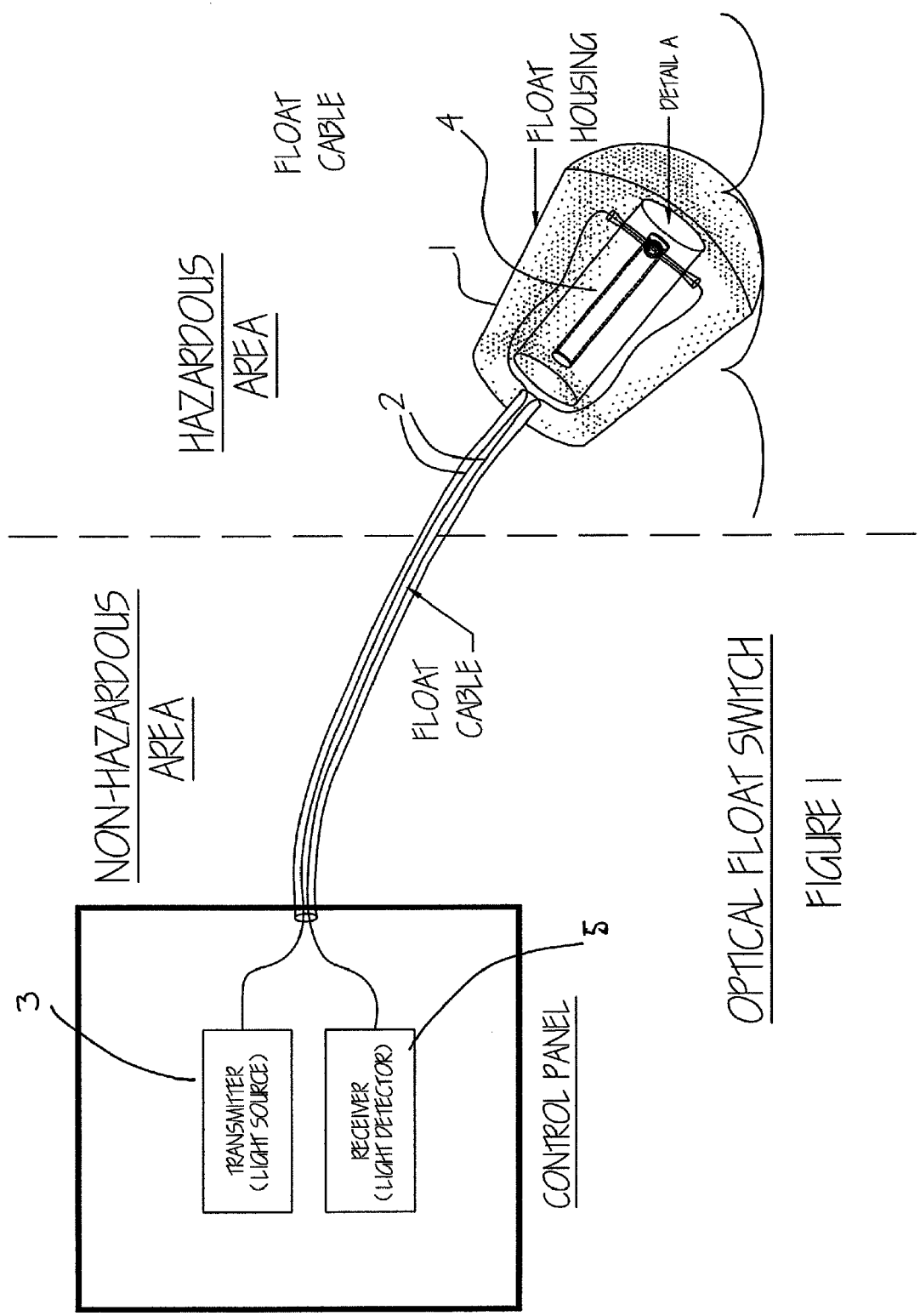

DETAIL A

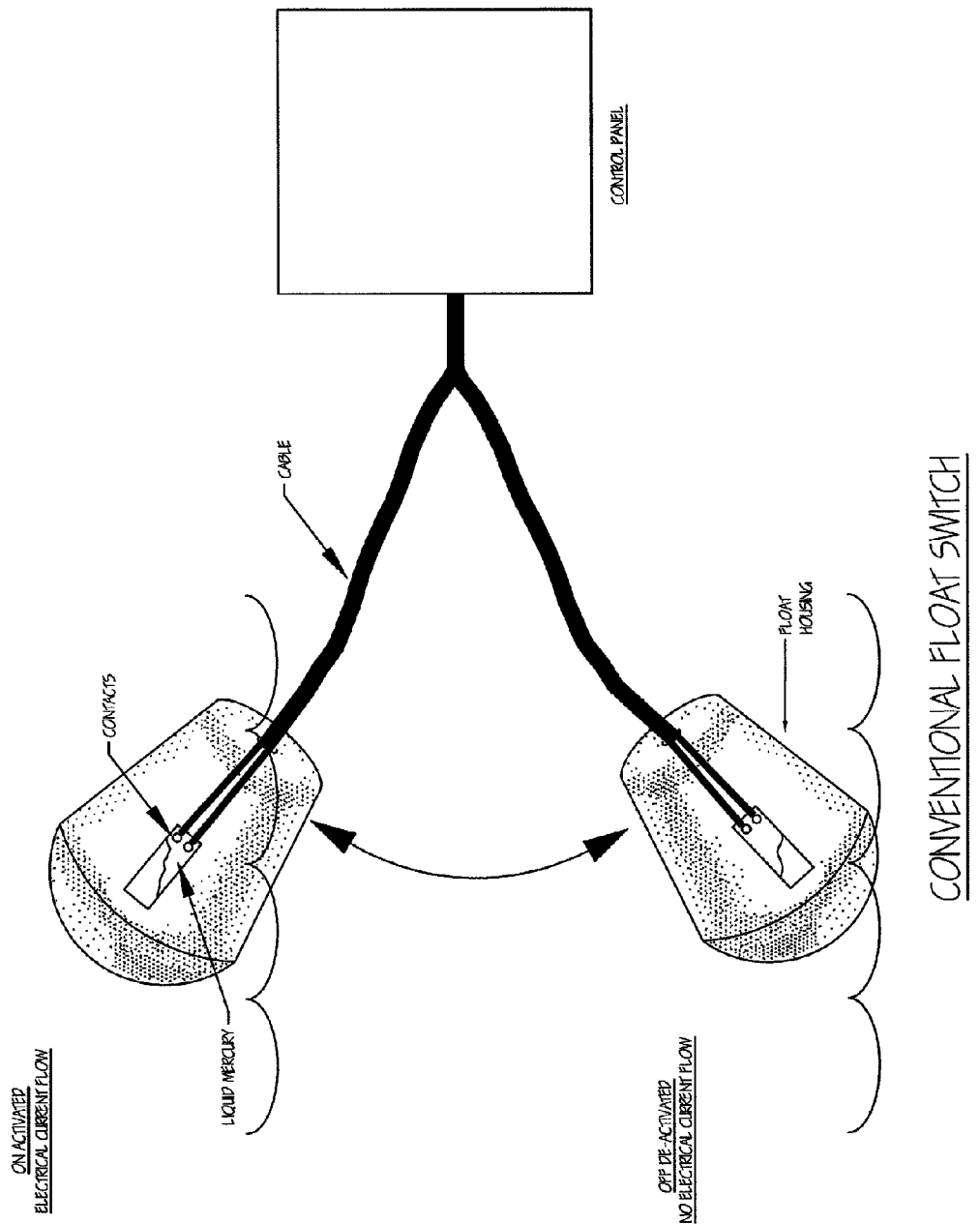

FLOAT ACTIVATED OPTICAL SWITCH

This application is a continuation application of U.S. application Ser. No. 11/241,909 filed on Oct. 3, 2005, and claims the priority benefit thereof and which is incorporated by reference herein in its entirety.

FIELD OF THE INVENTION

The invention relates to liquid level detection in a hazardous atmosphere. In particular, the invention uses a light beam from a transmitter located outside of the hazardous atmosphere which travels through a fiber optic cable into a hazardous area and travels back out of the hazardous area to a receiver that can detect the light beam.

BACKGROUND OF THE INVENTION

Pumping stations or tanks that contain hazardous and/or flammable or volatile liquids and chemicals to be pumped at predetermined levels are capable of containing gases that could explode if an electrical arc becomes present. Float switches are commonly used in this application to detect level for activation of a pump (see FIG. 2), but must have electrical current that passes through wires and a switch housed within the float. Wires from the float switch run to a control panel located external to the tank or pit and is located outside the hazardous area. As liquids rises in the tank the float tilts and a ball or conductive liquid, such as mercury, moves and makes contact with an electrical switch or contacts of some sort causing the switch to activate. Electrical current then passes from the control panel through the wires, to the switch, completing the circuit. These all cause a spark within the float that could cause an explosion if the float malfunctions. The wires leading to the float are also a source of arcing which can occur if the wires are damaged.

Some tanks containing flammable liquids or gases use ultra sonic level detection which sends a sonic burst to the surface of the liquid and then back. The transit time of the beam is used to determine the liquid level. No electrical current is used within the tank or pit and the transmitter and receiver are located external to the hazardous atmosphere. This method is not generally used to remotely signal a device, such as a signal to engage/disengage a pump (such as a dosing pump) at discrete levels, as these level detectors will detect all heights and hence additional logic circuits are needed to select a predetermined height for operation of a pump, thereby raising the complexity and expense of such as system.

SUMMARY OF THE INVENTION

The invention is an optically activated switch for use in a hazardous environment, and in particular, to signal the need to operate a pump. The invention uses a light beam from a transmitter located outside of the hazardous atmosphere which travels through a light carrying cable, tube or light guide (all considered a "light guide") to a float means located in a hazardous area, where the light can travel outside of the hazardous area to a light sensitive receiver. Several means of breaking or interrupting the light can be utilized.

OBJECTS OF THE INVENTION

It is an object of the invention to have a switch using no source of electrical current or electrical resistance within a hazardous environment.

BRIEF DESCRIPTION OF THE DRAWINGS

FIG. 2 depicts a conventional float.

DETAILED DESCRIPTION OF THE INVENTION

Figure 1:
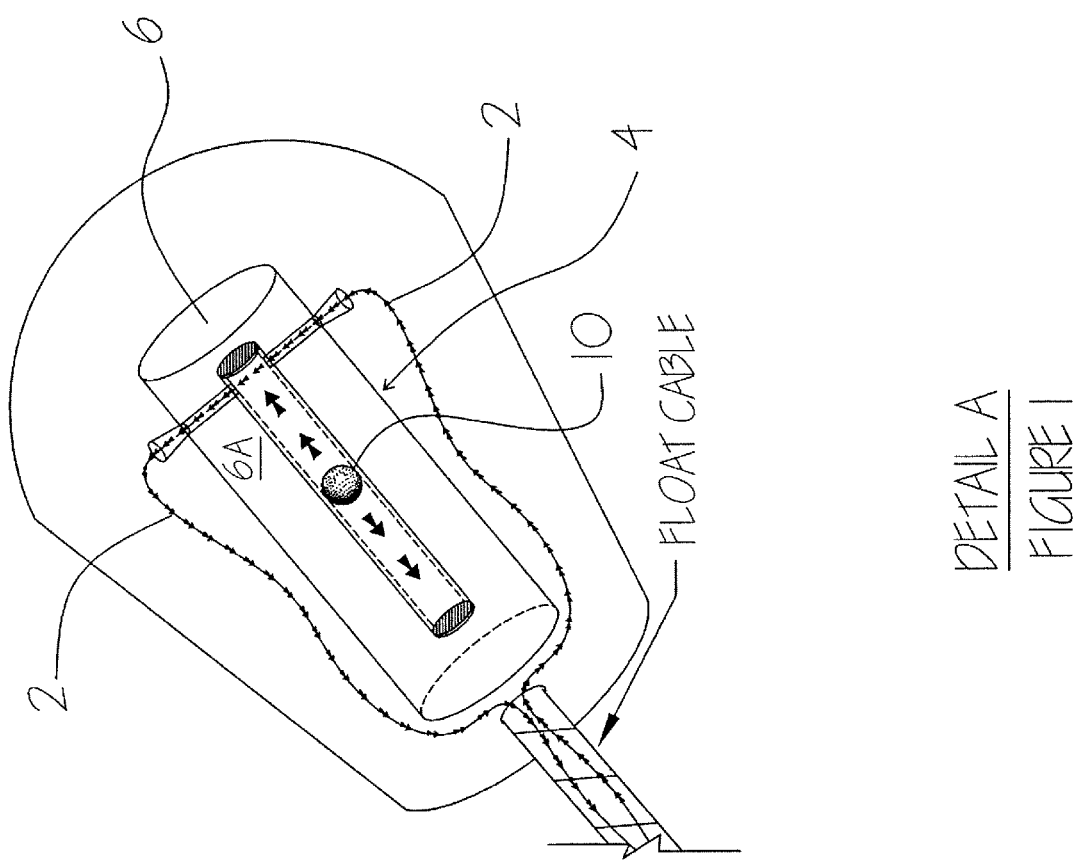
FIG. 1 depicts an optically activated float.

Shown in FIG. 1 is an embodiment of the invention. The invention includes a housing 1, two light guides 2 (hereafter described as fiber optic cables), a light source 3, and a means to interrupt the beam 4. The two cables 2 are positioned on the housing 1. Each cable terminates at or within the floating housing 1. The terminal ends of the cables are attached to a separator assembly 6 that positions the terminal ends of the two cables near each other, but separated by a gap 10. (see FIG. 1, detail A). The gap 10 is generally positioned in the separator assembly 6 within the side the housing 1. The gap can vary in size, with 0.01-0.5 inch suitable for most applications. The ends of the two fiber optic cables should be "optically aligned" (that is, light emitted from one terminal end will travel though the gap (possibly along a zig-zag path if reflective material such as mirrors are employed) and a portion of the transmitted light will enter the terminal end of the second cable) The separator assembly 6 generally includes an internal chamber 6A with one fiber cable 2 terminal end positioned in or on the wall of the interior chamber and the other fiber optic cable 2 terminal end positioned on an opposite wall of the internal chamber 6A, with the two ends optically aligned. In the embodiment shown in FIG. 1, the housing 1 is floatable, and the cables "tether" the housing 1, allowing the float to rise and fall with the media for a range of elevations. One of the fiber optic cables is connected to a light source 3, and the other cable is connected to a light detector 5. The light source 3 can be any suitable source, such as a laser, incandescent light bulb, sun, or a light emitting diode. Preferably the light source 3 and light receiver 5 will be located external to the hazardous area in a control panel, and only the fiber optic cables will travel into the hazardous area to the housing 1.

As shown in the Detail A of FIG. 1, the internal chamber 6A of the separator assembly 6 creates the needed gap between the fiber optic cables 2 terminal ends. Located within the internal chamber 6A is a means to interrupt a light beam 10, such as a rollable or slidable ball or bar, or opaque fluid positioned within the internal chamber. If the housing floats, at a certain level the floating housing will tilt (as it is tethered by action of the cables) and as it tilts, the means to interrupt a light beam will move within the internal chamber. If the degree of movement is sufficient, the means to interrupt the light beam will block (or unblock) the light path between the two terminal ends of the fiber optic cables 2. Additionally, if the housing 1 is a fixed device (that is, it does not float on the media but is fixed at a desired height), the means to interrupt a light beam can be a floating arm or floating barrier positioned in the internal chamber 6A of the housing: as the water level rises up to the level of the housing, the floating arm or barrier will rise (much like a floating limit switch) to block the light beam (or unblock the light beam). In this instance, the switch will have a means to fix the elevation of the housing, such as a clamp to attach the switch to a structure in the hazardous environment, such as a dosing pump or to the container storing the hazardous material.

A floating housing 1 can be constructed in any number of ways. One such way would be to use two part foam in a mold incasing the separator assembly within. It also could be constructed of two halves fused together by glue or heat also containing the separator assembly. Any object that floats could be drilled or carved out and the separator assembly could be inserted inside and then sealed using any number of means.

The receiver or detector 5 can be located external to the hazardous area in a control panel and is not required to be located with the light source. Any number of commercially available devices that are sensitive to light energy, such as devices containing a photo eye or photo transistor, are suitable as a light detector or receiver. Hence, the presence or absence of light at the receiver is indicative of the position of the floating housing in the hazardous environment and can be utilized as a signal means to perform a specific task such as starting or stopping a pump.

In this fashion, the components of the optical switch are electrically isolated from the hazardous environment, and the only energy present is a light beam. In a hazardous environment, such an optical switch presents a safe and economic alternative to conventional switches using an electrical contact in the hazardous environment, presenting a potential source of electric spark and ignition within the hazardous environment.

We claim:

1. A float activated optical switch, comprising a number of components including a float, having an outer surface defining a float interior;
    a powered light source;
    a powered light detector, said light source and light detector located remote from said float;
    a first light guide having proximal and distal ends, said first light guide connected to said light source;
    a second light guide having proximal and distal ends, said second light guide connected to said light detector, said first and second light guides distal ends positioned in said float interior and said distal ends being optically aligned but separated by a gap in said float interior;
    and a means to interrupt a light beam, said means to interrupt a light beam adapted to removably occupy said gap in said float interior;
    said float and said components positioned in said float interior being floatable in a desired liquid, said first and second light guides coupled to said float and adapted to bend between said distal and proximal ends with movement of said float from a first position, where said means to interrupt is positioned to allow light transmission between said distal ends of said first and second light guides, to a second position, where said means to interrupt is positioned to interrupt light transmission between said distal ends of said first and second light guides.

2. The float activated switch of claim 1 wherein said float interior is sealed from an environment exterior to said float interior.

3. The float activated optical switch of claim 1 further having a separator assembly component in said float interior and having a hollow interior portion, said distal ends of said light guides being located in said separator assembly, said gap separating said distal ends of said light guides being located in said separator assembly hollow interior portion.

4. The float activated optical switch of claim 1 wherein said means to interrupt a light beam comprises an optically opaque device that is slidable in said gap.

5. The float activated optical switch of claim 1 wherein said means to interrupt a light beam comprises an optically opaque device that is rollable in said gap.

6. The float activated optical switch of claim 1 wherein said first and second light guides are contained in a cable, said cable being sealingly positioned in said float.

7. A float activated optical switch for use with a remote light source and remote light detector, said float activated optical switch comprising a number of components, including a float, said float having a float interior;
    a first light guide connectable to a light source;
    a second light guide connectable to a light detector, said first and second light guides having distal ends positioned in said float interior and said distal ends being optically aligned but separated by a gap in said float interior;
    and a means to interrupt a light beam, said means to interrupt and adapted to removably occupy said gap between said distal ends of said first and second light guides;
    where said float interior lacks a powered light source and powered light detector, and where said float and said components positioned in said float interior are configured to be floatable in a desired fluid, said first and second light guides coupled to said float and adapted to follow and move with said float as said float moves from a first position, where said means to interrupt is positioned to allow light transmission between said distal ends of said first and second light guides, to a second position, where said means to interrupt is positioned to interrupt light transmission between said distal ends of said first and second light guides.

8. The float activated switch of claim 7 wherein said float interior is sealed from an environment exterior to said float interior.

9. The float activated optical switch of claim 7 further having a separator assembly component, said separator assembly located in said float interior and having a hollow interior portion, wherein said distal ends of said light guides are located in said separator assembly and said gap, separating said distal ends of said light guides, is located in said separator assembly hollow interior portion.

10. The float activated optical switch of claim 7 wherein said means to interrupt a light beam comprises an optically opaque device that is slidable in said gap.

11. The float activated optical switch of claim 7 wherein said means to interrupt a light beam comprises an optically opaque device that is rollable in said gap.

12. The float activated optical switch of claim 7 wherein said first and second light guides are contained in a cable, said cable being sealingly positioned in float.

13. A method of detecting a level of a liquid in a tank comprising the steps of (a) deploying in a tank a float activated optical switch comprising a number of components, comprising a float having an interior, a first light guide, a second light guide, said first and second light guides having proximal and distal ends, said distal ends positioned in said float interior and said distal ends being optically aligned but separated by a gap contained in said float interior, and a means to interrupt a light beam, said means to interrupt a light beam adapted to removably occupy said gap, where said float interior lacks a powered light source and powered light detector and said float and said components positioned in said float interior being floatable in the liquid in the tank;
    (b) connecting said first light guide proximal end to a powered light source,
    (c) connecting said second light guide proximal end to powered light detector, said light source and said light detector are located remote from said float,
    (d) tethering said float activated optical switch to a fixed location in said tank; said float movable to a first position to allow light transmission between said distal ends of said first and second light guides, and to a second position, where said means to interrupt is positioned to interrupt light transmission between said distal ends of said first and second light guides, said first and second light guides bending between said distal and proximal ends in response to said movement of said float to said first position or said second position, (e) emitting a light from said light source for transmission by said first light guide, and examining said second light guide with said light receiver for the presence or absence of a light.

14. A method of detecting a level of a liquid in a tank of claim 13 wherein said float interior is sealed from an environment exterior to said float interior.

15. A method of detecting a level of a liquid in a tank of claim 13 wherein said float activated optical switch further comprises a separator assembly in said float interior and having a hollow interior portion, said distal ends of said light guides being located in said separator assembly, said gap, separating said distal ends of said light guides, being located in said separator assembly hollow interior portion.

16. A method of detecting a level of a liquid in a tank of claim 13 wherein said means to interrupt a light beam comprises an optically opaque device that is slidable in said gap.

17. A method of detecting a level of a liquid in a tank of claim 13 wherein said means to interrupt a light beam comprises an optically opaque device that is rollable in said gap.

* * * * *